UNITED STATES PATENT OFFICE.

JAMES C. GOSTLING, OF NEW YORK, N. Y.

IMPROVEMENT IN HYDRAULIC CEMENTS.

Specification forming part of Letters Patent No. 194,143, dated August 14, 1877; application filed July 30, 1877.

*To all whom it may concern:*

Be it known that I, JAMES C. GOSTLING, of the city, county, and State of New York, have invented a new and Improved Hydraulic Cement, of which the following is a specification:

My invention relates to an improved hydraulic cement; and it consists in a composition formed by mixing together calcareous shell-marl, containing from seventy to eighty per cent. of carbonate of lime, silicious clay, pozzolana or anthracite-coal ashes, and ribbon-stone containing a large percentage of magnesia.

To prepare the cement, take nine parts of marl, and, by means of a reverberatory furnace, calcine it to destroy the animal or foreign matter contained therein; draw from the furnace and allow it to cool. Then add four parts of silicious clay and ten per cent. of pozzolana or anthracite-coal ashes, and the same quantity of powdered ribbon-stone. Mix the ingredients, add water, and reduce them in a wash-mill to a paste of sufficient firmness to pass through a wire sieve of twenty-five mesh to the inch. While it is still wet, pass it through a burr-stone mill driven at the rate of one hundred and fifty revolutions per minute, to reduce it to an impalpable paste. From thence convey it to the drying stoves or plates and permit it to dry.

When sufficiently dry, place it in a kiln, in alternating layers with coal or coke, and burn it to a moderately hard clinker. After burning, grind it, by means of burr-stones or other suitable machinery, to a powder sufficiently fine to pass through a sieve of fifty meshes to the square inch.

This cement is equal in every respect to the best quality of imported hydraulic cement, and is used in the same manner.

Having thus fully described my invention, I claim as new and desire to secure by Letters Patent—

1. A compound consisting of calcareous shell-marl, clay, pozzolana or anthracite-coal ashes, and ribbon-stone, substantially as described.

2. The process of preparing hydraulic cement by calcining marl, mixing it with clay, pozzolana, or anthracite-coal ashes, and ribbon-stone, reducing the mixture to a paste with water, afterward burning it to a clinker, and grinding it to powder, as herein specified.

JAMES C. GOSTLING.

Witnesses:
C. SEDGWICK,
GEO. M. HOPKINS.